Dec. 27, 1960 J. J. HENDRICKSON 2,966,363
CHUCK ASSEMBLY
Filed Nov. 14, 1958
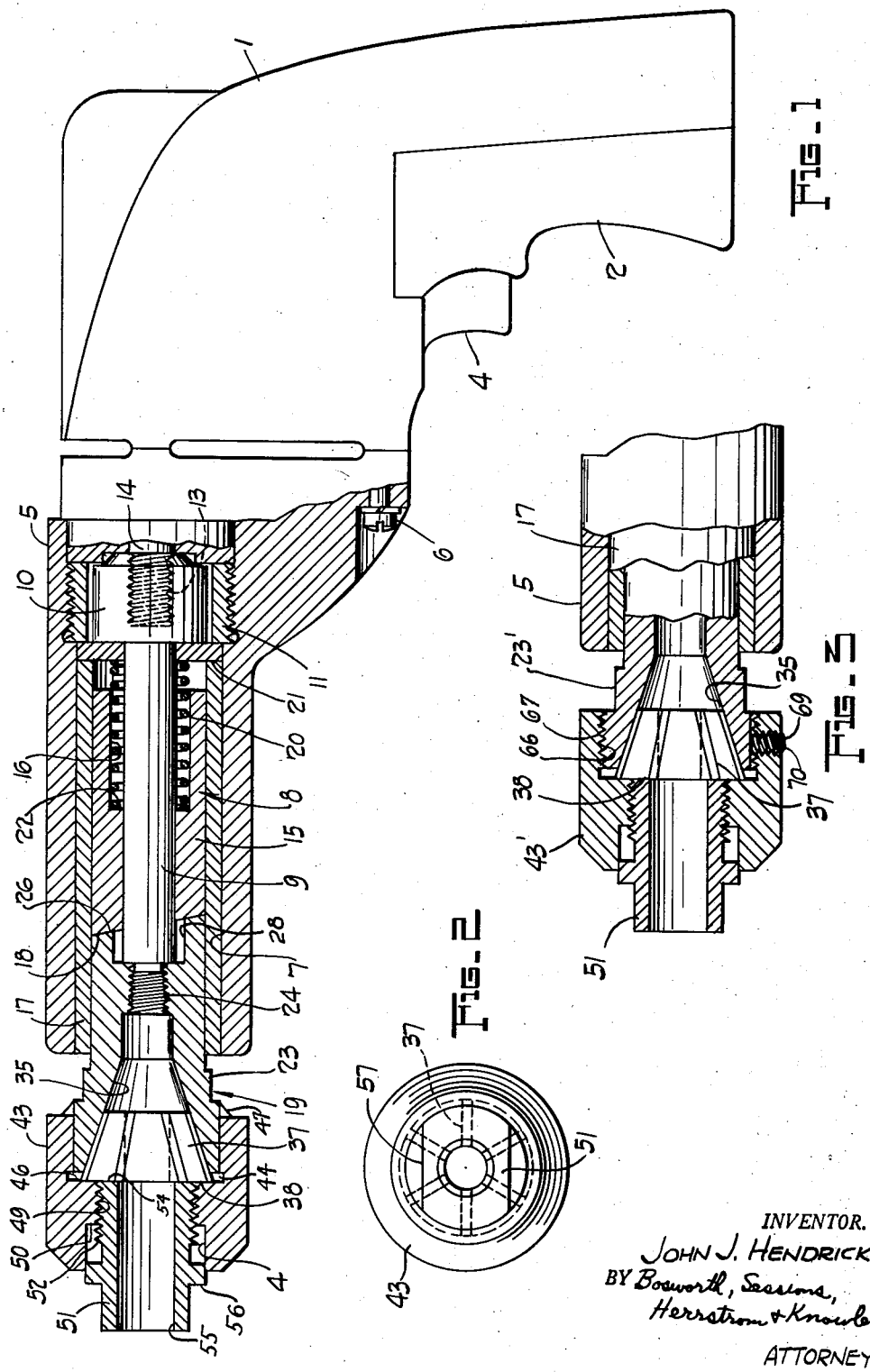
INVENTOR.
JOHN J. HENDRICKSON
BY Bosworth, Sessions,
Herrstrom & Knowles
ATTORNEYS

United States Patent Office 2,966,363
Patented Dec. 27, 1960

2,966,363

CHUCK ASSEMBLY

John J. Hendrickson, Mentor, Ohio, assignor to Hendrickson Machine Company, Cleveland, Ohio, a corporation of Ohio Filed Nov. 14, 1958, Ser. No. 773,947

6 Claims. (Cl. 279—52)

This invention relates to drill chucks and more particularly to chucks for impact drills and percussive tools wherein the bit or tool is subjected to repeated and rapid impacts or pounding during operation of the drill or tool.

Impact drills, percussive tools and the like are commonly used for drilling rock, concrete and other masonry products and have many potential uses and applications in industry, commerce and residences where it is desirable, necessary or advantageous that the bit or tool be subjected to frequent and rapid pounding or impacting. Such drills and tools are commonly provided with removable or interchangeable bits which are frequently rotated, as well as impacted or pounded, by the operating mechanism.

Impact drills and percussive tools have not, however, had the wide adaptation they might have had and which their utility and convenience would indicate they should have because of the difficulties in providing a satisfactory chuck or means for positively, securely and tightly gripping and holding the bits, despite the pounding and jarring to which the same are subjected, during use for a sufficient length of time to accomplish the necessary work. Thus, for example, the repeated and rapid impacts and jarring to which the chucks of impact drills and percussive tools are subjected during use quickly causes the usual metallic jaws to fracture and slip and quickly causes the collars, which are used to tighten resilient diametrically constrictable collets, to loosen and release the pressure on the collet. Further set screws for holding the tightened collars, in chucks having resilient collets, in place, have proven unsatisfactory both because of loosening and because of damage caused to the threads upon which the collars are tightened; nor has it proven sufficient to use finer threads on the chuck and the collar.

It is therefore a general object of this invention to provide an improved chuck for impact drills, percussive tools and the like. Further objects of this invention include the provision of an improved chuck for impact drills, percussive tools and the like which securely and tightly engages the bit or tool and is not jarred loose by the impacts and pounding to which the drill or tool is subjected during use; which does not damage the threads by which the chuck is forced to grip and engage the bit or tool; and which permits the ready and rapid change and interchange of the bits or tools gripped thereby.

Still further objects of this invention include the provision of a chuck for impact drills, percussive tools and the like which is not damaged by the pounding and impacts imparted to the bit during use; which is relatively economically manufactured; which has a long life; which may be used with impact drills, percussive tools and the like having mechanism which rotates as well as pounds or impacts the bits; which may be used by unskilled labor; and which requires no special tools or other apparatus in order to tighten the chuck into secure gripping engagement with the bit.

These and other objects and advantages of this invention will appear from the following description of preferred forms thereof, reference being had to the drawings in which:

Figure 1 is an elevation partly in section, of a rotary impact drill having a chuck embodying a preferred form of this invention;

Figure 2 is an end view of the chuck shown in Figure 1; and

Figure 3 is a view similar to Figure 1, with certain parts broken away, showing a chuck embodying another preferred form of this invention.

The impact drill illustrated, somewhat diagrammatically, in Figure 1 is one example of the type of tool for which chucks able to withstand vibrations resulting from frequent and rapid impacts are used and/or necessary. Such chucks are also used and/or necessary or may come to be used and/or necessary in other types of tools and for other uses and applications. Accordingly, although this invention will be described in connection with the impact drill shown in Figure 1, this is by way of illustration only and it is to be understood that chucks embodying this invention may be used with other types of tools and apparatus.

Briefly, the impact drill shown in Figure 1 comprises a motor housing 1 in which an electric motor having an electric cord, not shown, for connection to a suitable power source is mounted. Housing 1 includes a handle portion 2, by which the tool is held by the user, and a finger actuated switch 4 for controlling the motor. A second longitudinally extending housing 5 is secured to the front, leftward as viewed, of housing 1 by means of suitable screws 6. Housing 5 has a central longitudinally extending stepped bore 7 within which the hammer or impact mechanism, indicated generally at 8, is disposed. Hammer or impact mechanism 8 includes a drive shaft 9 having an enlarged inner, rightward as viewed, end or head 10 which is rotatably supported within a bearing 11 mounted at the inner enlarged end of bore 7. The inner end of head 10 is drilled and internally threaded as at 13 so that shaft 9 may be mounted on stub shaft 14, which is driven through a suitable gear train, not shown, by the motor. Hammer mechanism 8 also includes a hammer 15 having a central bore 16 through which shaft 9 extends. Hammer 15 is slidably supported within bearing 17 which is press fitted into bore 7. Hammer 15 is restrained against rotation by suitable means such as a complementary key and groove (not shown) carried by hammer 15 and bearing 17, respectively, and bore 16 is of sufficient diameter to permit shaft 9 to rotate freely within hammer 15. The outer end (leftward as viewed) of hammer 15 is provided with one or more cams 18 which are adapted to engage and coact with similar cams on the chuck, indicated generally at 19, as will hereinafter more fully appear.

A spring 20 is disposed about shaft 9 and seats upon and acts between hammer 15 and a stop member 21 which is press fitted within the bore 7 adjacent the bearing 11. Bore 16 may be stepped as at 22 to provide a seat for spring 20 and the spring functions to urge the hammer toward the chuck 19.

Chuck 19 includes a body member 23 which is mounted, as by threads 24, on the outer, leftward as viewed, end of shaft 9 and is rotatably supported within bearing 17. As indicated above, the inner end of member 23 is provided with a plurality of cams 26, which are complementary to and coact with cams 18 on hammer 15.

Cams 18 and 26 have a saw tooth shape. Cams 26 rotate with chuck 19 and each cam 26 has a sloping surface facing the direction of rotation, a peak and a flat straight longitudinally extending surface facing away from the direction of rotation. Cams 18 do not rotate and each cam 18 has a sloping surface facing away from, a peak, and a straight longitudinally extending surface facing the direction of rotation of cam 26. As member 23 rotates the sloping surface of each cam 26 engages the sloping surface of each cam 18 and rotates relative thereto, to bring the peaks of the cams into longitudinal alignment and to displace the hammer inwardly, rightwardly as viewed, against the force of spring 20. Once the peak of cam 26 has rotated past the peak of cam 18, spring 20 forces the hammer 15 rapidly outwardly, leftwardly as viewed, against the member 23 thereby imparting a sharp impact or hammer blow to the chuck and the bit or tool supported thereby. Conveniently two cams 18 and 26 are carried by hammer 15 and member 23 respectively, so that the hammer impacts the member 23 twice upon each rotation of member 23, albeit more or less caps may be provided if desired.

Member 23 is conveniently counterbored, as at 28, in order to reduce the area of contact between the cams 18 and 26 and thereby reduce the frictional resistance to the rotation of chuck 19 by the spring pressed non-rotatable hammer 15.

The outer end of member 23, i.e., the end remote from the shaft 9, is provided with a frusto-conical bore 35 which serves as a seat for collet 37. Collet 37 comprises a plurality of radially alternating rubber and metal ribs having a central hole for receiving the bit or tool. Collet 37 is brought into gripping engagement with the bit or tool by exerting sufficient force on the outer face 38 of the collet to displace the collet longitudinally into the bore, thereby causing the collet simultaneously to constrict diametrically and engage the bit or tool. The rubber ribs are of less radial length than the metal ribs so that as the collet is displaced longitudinally into the bore and constricted diametrically, the engagement by the collet with the bore and bit is by the metal ribs and the rubber, which is compressed incidental to the displacement and constriction of the collet, tends to flow into and fill the spaces intermediate the longer metallic ribs. Conveniently the collet 37 is hexagonal in cross-section and the metallic ribs extend radially from the corners of the hexagon to the central hole of the collet and are fused and bonded to the interconnecting rubber ribs.

This invention comprises means to displace and constrict the collet into a tight and permanent (as long as desired) gripping engagement, with the bit or tool, which withstands, without loosening, the pounding and jarring to which the chuck is subjected during use of the tool of which it is a part.

To this end means is provided which retains the collet within the chuck bore and provides a threaded central aperture forwardly and within the radial confines of the maximum external diameter of the collet for coaction with a sleeve which is adapted to tighten against the outer face of the collet and force the collet into engagement with the bit or tool.

More particularly such means preferably includes a collar 43 which is adapted to fit over the outer end of body member 23 and to retain the collet 37 in place in the bore 35, once the collet has been placed within the bore. Collar 43 is provided with a stepped central bore 44 having a rearwardly facing internal shoulder 46 which is adapted to engage the peripheral edge of the face of the collet 37 to retain the collet in place. Since the maximum external diameter of the collet 37 is greater than the minimum internal diameter of the bore 44, the collar 43 conveniently is a separate part from body member 23 so that the collet may be placed readily within the bore 35. In practice it is only necessary that the collet be placed in the bore 35 and the collar be pushed over the member 23, with sufficient force to seat and retain the collet in place without constricting the same. Collar 43 is secured in place by any convenient means such as welds 47.

Bore 44 is also provided, intermediate its ends, with internal threads 49 and conveniently with an outwardly facing shoulder 50. As suggested above the internal diameter of the threads 49 is less than the maximum external diameter of the collet 37.

In order to displace and constrict collet 37 after the bit or tool is disposed therein an adjustable tightening sleeve 51 is provided within bore 44. Sleeve 51 has external threads 52 which engage and coact with threads 49 to advance the sleeve into and out of bore 44, an inner flat transverse surface 54 which bears upon and engages the radially inner portion of collet face 38 to force the collet into bore 35, and a central bore 55 through which the bit or tool extends. Preferably sleeve 51 is longer than bore 44 and the leftward end thereof is enlarged as at 56 and squared off as at 57, see Figure 2, or otherwise shaped in order to provide a convenient surface for engagement by a wrench or similar tool.

Threads 49 and 52 are preferably of relatively fine pitch and the collet 37 is displaced, constricted and brought into gripping engagement with the bit or tool entirely by the action and tightening of the sleeve 51 against the collet face 38.

When an impact chuck embodying this invention is in use with the collet disposed in bore 35 and the collar mounted on and secured to member 23, sleeve 51 is withdrawn until the collet 37 is in a free or at rest condition. A bit, not shown, is then positioned within the sleeve and collet and the sleeve 51 is drawn up, as by means of a wrench, against the collet face 38, thereby displacing the collet into the bore 35 and constricting the same against the bit and between the bit and interior wall of the bore 35 so as to hold the bit securely in place.

The collet holds the bit tightly and permanently without loosening or releasing the bit even though the tool is subjected to long periods of use and rapid pounding of the hammer 15 against the member 23.

To change bits it is only necessary to loosen or withdraw the sleeve 51 until the bit is freed from the grip of the collet. The old bit is then removed and a new one placed in the sleeve and collet, which are then tightened as before.

Another preferred form of this invention is shown in Figure 3, with like reference characters referring to like parts. This form of the invention is particularly useful in those instances where it is necessary or desirable to change collet 37 frequently. As shown in Figure 3 body member 23' is similar to body member 23 except that the outer, leftward as viewed, exterior is provided with external threads 66 and collar 43' is provided with internal threads 67, which are adapted to engage and coact with thread 67 to hold collar 43' on member 23'. Threads 67 are disposed to the rearward, rightward as viewed, of shoulder 46 and function only to facilitate positioning collar 43' on member 23' and do not draw or force the collet into gripping engagement with the bit or tool.

Once collar 43' has been positioned on member 23' it is conveniently held in place by means of set screw 69. Set screw 69 is tightened within a radially extending threaded hole 70 in collar 43' and preferably engages against a flat provided on the threads 66. Collar 43' need not be tightened or loosened or moved in any direction in order to change the bit or hold it securely and tightly in place. Rather with this form of the invention the bit is changed and secured in place in the same manner as with the first described form of this invention.

Changes and modifications to the preferred forms of the invention herein particularly disclosed and described will occur to those skilled in the art who come to understand the principles and precepts thereof. Accordingly, the scope of this patent should not be limited to the specific forms of the invention herein specifically disclosed and described but by the advance by which the invention has promoted the art.

I claim:
1. A chuck for rotary impact drills and other apparatus comprising a body member having an outwardly opening frusto-conical bore, a longitudinally displaceable radially constrictable collet disposed within said bore, said collet having a central bore for receiving a bit or tool and an outer face, a collar overlying the exterior of and secured to said body member, said collar having a stepped central bore with an interior rearwardly facing shoulder and interior threads of fine pitch forwardly of said shoulder, said shoulder being adapted to engage the outer periphery of said outer face of said collet to retain said collet within said bore of said body member, and a sleeve with a central bore extending into said bore of said collar, said sleeve having external threads engaging and coacting with said internal threads of said collar and a transversely extending inner face adapted to engage and bear upon said outer face of said collet and to displace and constrict said collet when said sleeve is tightened into said collar, said sleeve being of greater length than said bore of said collar and having an enlarged outer end with a squared exterior for engagement by a tightening tool.

2. A chuck for rotary impact drills and other apparatus comprising a body member having an outwardly opening frusto-conical bore, a longitudinally displaceable radially constrictable collet disposed within said bore and having a central bore for receiving a bit or tool and an outer face, a collar overlying the exterior of and secured to said body member, said collar having a central stepped bore with an interior rearwardly facing shoulder and interior threads of lesser diameter than the maximum diameter of said collet, said shoulder being adapted to engage the outer periphery of said outer face of said collet to retain said collet within said conical bore, and a sleeve extending into said bore of said collar, said sleeve having a central internal bore, external threads engaging and coacting with said threads of said collar and a transversely extending inner face adapted to exert a force upon said outer face of said collet and to displace and constrict said collet when said sleeve is tightened into said collar.

3. The chuck according to claim 2 in which said body member is threaded externally, said collar bore is enlarged and internally threaded rearwardly of said shoulder, said collar has a radially extending threaded hole extending therethrough and into said enlarged internally threaded portion of said collar bore, and a set screw is mounted in said radially extending hole whereby said collar is mounted on said body member by engagement between said body member threads and said last named threads of said collar and is secured on said body by tightening said set screw against said body member.

4. A chuck for rotary impact drills and other apparatus comprising a body member having a bore with a longitudinally displaceable radially constrictable collet disposed therein, said collet having a central bore for receiving a bit or tool and an outer face, a collar secured to said body member, said collar having a central bore with internal threads and being adapted to engage the outer periphery of said outer face of said collet to retain said collet within said bore of said body member, and a sleeve having a central internal bore extending into said bore of said collar, said sleeve also having external threads engaging and coacting with said threads of said collar and a transversely extending inner face adapted to exert a force upon said outer face of said collet and to displace and constrict said collet when said sleeve is tightened into said collar.

5. A chuck for rotary impact tools and other apparatus comprising a body member having a bore with a longitudinally displaceable radially constrictable collet disposed therein, said collet having a central bore for receiving a bit or tool and an outer face, means carried by said body member and engaging said collet for retaining said collet within said bore of said body member, and sleeve means having a central internal bore and a bearing surface adapted to engage said outer face of said collet, said sleeve means engaging and coacting with said first named means to displace and constrict said collet, the engagement between said sleeve means and said first named means being radially within the maximum external diameter of said collet.

6. A chuck for rotary impact tools and other apparatus comprising a body member having an outwardly opening frusto-conical bore, a longitudinally displaceable, radially constrictable collet disposed within said bore and having a central bore for receiving the shank of a bit or tool and an outer face, a collar secured to said body member and extending outwardly beyond said outer face of said collet, said collar having a central bore and interior threads disposed outwardly of said outer face of said collet, said collar thread being of lesser diameter than the maximum diameter of said collet, and a sleeve extending into said bore of said collar, said sleeve having a central internal bore for the tool or bit, external threads engaging and co-acting with said threads of said collar and an inner face adapted to engage and exert a force upon said outer face of said collet to displace and constrict said collet when said sleeve is tightened into said collar.

References Cited in the file of this patent
UNITED STATES PATENTS

| | | |
|---|---|---|
| 1,520,883 | Pfunder | Dec. 30, 1924 |
| 1,910,121 | Muntz | May 23, 1933 |
| 2,789,653 | Fannen | Apr. 23, 1957 |